United States Patent
Van Horn

[15] 3,670,858
[45] June 20, 1972

[54] SEGMENTAL FRICTION MEMBER FOR BRAKE OR CLUTCH

[72] Inventor: Russell F. Van Horn, 1415 Evanston Road, Tipp City, Ohio 45371

[22] Filed: April 26, 1971

[21] Appl. No.: 137,135

[52] U.S. Cl. ................................. 192/107 R, 188/218 XL
[51] Int. Cl. ............................................. F16d 13/60
[58] Field of Search ........... 192/107 R; 188/218 XL, 264 CC, 188/70.2

[56] References Cited

UNITED STATES PATENTS

| | | | |
|---|---|---|---|
| 3,456,768 | 11/1967 | Le Blanc | 192/107 R |
| 3,473,635 | 10/1969 | Krause | 188/218 X |
| 3,550,740 | 5/1968 | Le Blanc | 192/107 R |
| 3,605,968 | 9/1969 | Ely | 192/107 R |

Primary Examiner—Allan D. Herrmann
Assistant Examiner—Randall Heald
Attorney—John D. Haney

[57] ABSTRACT

A stator or rotor of a brake or clutch mechanism having pairs of stamped plates riveted together in back-to-back relationship forming sector-shaped segmental members for frictional engagement with other parts of the mechanism. Torque links between the segmental members have flanges which are connected to lugs on one of the plates of each pair forming an annulus in which the movement of the segmental members is controlled while at the same time clearance is provided for contraction and expansion. The flanges on the torque link members have a thickness substantially equal to the thickness of one of the plates and a channel portion having a thickness substantially equal to the thickness of the pair of plates providing segmental members of substantial thickness made from stampings and requiring a minimum of machining.

12 Claims, 7 Drawing Figures

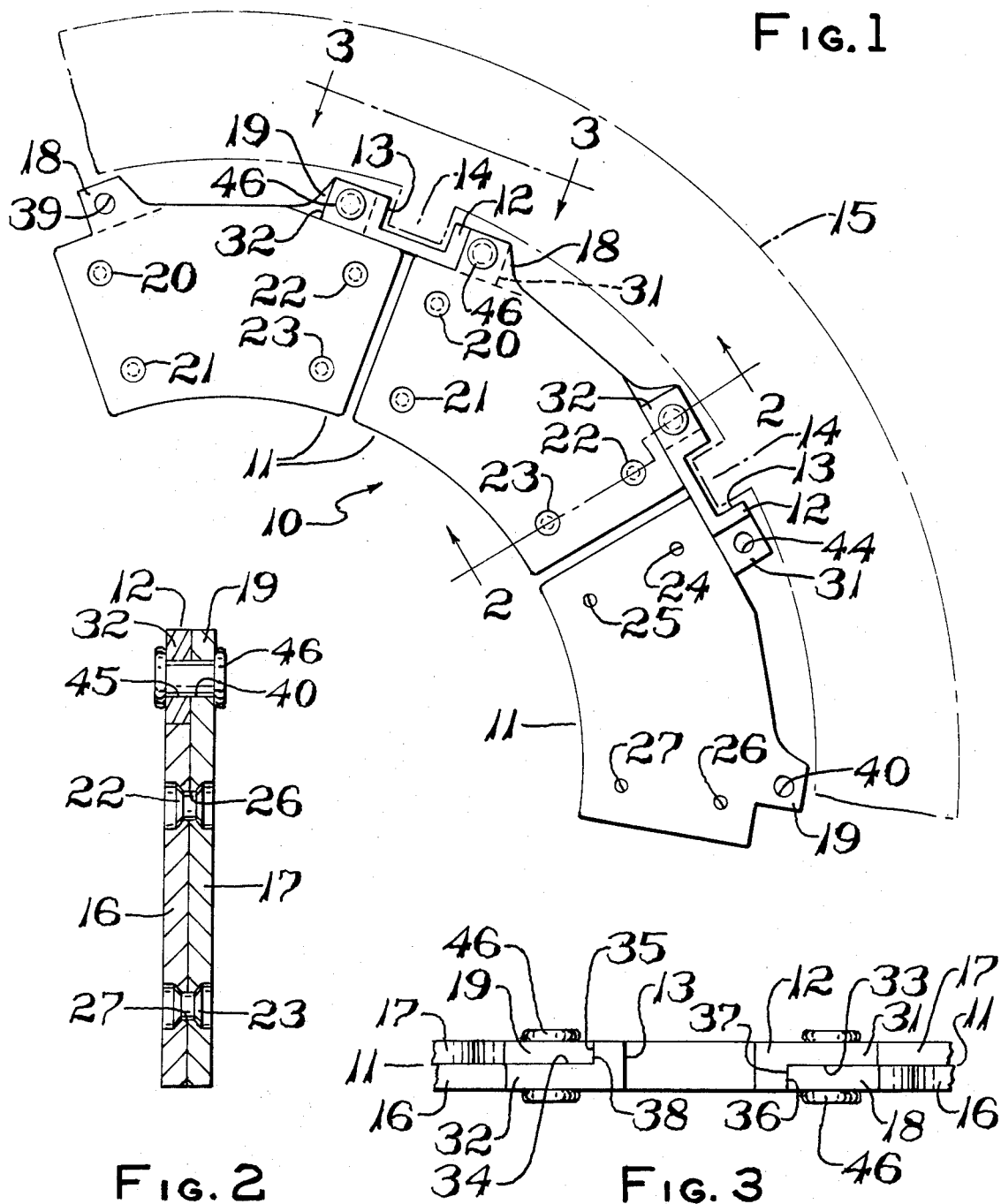

PATENTED JUN 20 1972   3,670,858

INVENTOR.
RUSSELL F. VAN HORN
BY
John D. Haney
ATTY.

SEGMENTAL FRICTION MEMBER FOR BRAKE OR CLUTCH

BACKGROUND OF THE INVENTION

This invention relates to annular segmental friction members for disc style brakes or clutches. A segmental friction member assembled according to this invention may be used as one element of a friction couple in a brake or clutch and may be employed as a so-called heat sink element in a high energy brake such as that used for aircraft. In the present invention application, the invention is applied to a friction member used as a rotor heat sink disc in an aircraft style brake.

It has been found that segmented type discs in which individual segments are positively interconnected one to another by simple individual so-called torque link members in the area outside the high temperature zones swept during engagement of the friction members provide for smooth operation of a brake. In one application of this construction, the individual segments are produced by stamping sector-shaped plate members from high alloy steel having the desired wear and friction properties. These segments have provided the necessary braking action; however, the life of the segments has been limited by the thickness of the steel plates which can be stamped. The maximum practical thickness of stampings of this type is approximately one-half inch.

It has also been found that to provide the connecting lugs at the outer periphery of the segments the stamped plate must be machined so that the lug is approximately one-half the thickness of the plate members. The use of single plate members having a maximum stamped thickness results in a distortion of the segment due to thermal differentials which is greater than the distortion of a segment of lesser thickness.

The torque links connecting the individual segments have flanges which overlap the lugs on the segments and because the overlapping flanges are located on one side of the segments, there is a transfer of torque from an offcenter position to the channels and splined engagement with the associated members of the brake which is not always desirable.

SUMMARY OF THE INVENTION

According to this invention, an annular brake member is provided in which the stamped plates have a lesser thickness than unitary segments and are subjected therefore to less distortion from thermal differentials. In addition to the reduced distortion, the segments have an overall thickness providing better wear life for the annular brake member. The built-up construction makes possible the use of one stamping of the same shape for both plates. This stamping includes a lug providing a connection to the torque link for controlling the relative movement of the segments while at the same time allowing enough clearance for expansion and contraction. Furthermore, the construction of the torque links is such as to distribute the torque forces evenly to the torque link channel which is in splined connection with an associated part of the brake.

With the riveted construction, the transfer of the torque forces between the plates making up the segments is accomplished efficiently and allowance is made for the expansion and contraction of the parts. Another advantage of this construction is that with a thicker segment the width of the torque links may be greater providing a channel section of increased length having increased bearing surface for engagement with the splines of the brake mechanism and therefore there is less possibility of binding between the splines and the channel of the torque link members.

The accompanying drawings show a preferred form and a modification of a segmental brake member made in accordance with and embodying this invention and which are representative of how this invention may be practiced.

BRIEF DESCRIPTION OF THE DRAWINGS

In the drawings:

FIG. 1 is an elevation of a part of an annular disc assembly (shown in solid lines), certain parts being broken away, and illustrated in torque-driving engagement with a related part which in this example may be a rotatable wheel, the sides of which are represented by the chain-dotted lines;

FIG. 2 is an enlarged detailed view of the disc assembly taken along the plane of line 2—2 of FIG. 1;

FIG. 3 is a fragmentary detailed view taken along the plane of line 3—3 of FIG. 1;

DETAILED DESCRIPTION

Figure 4:
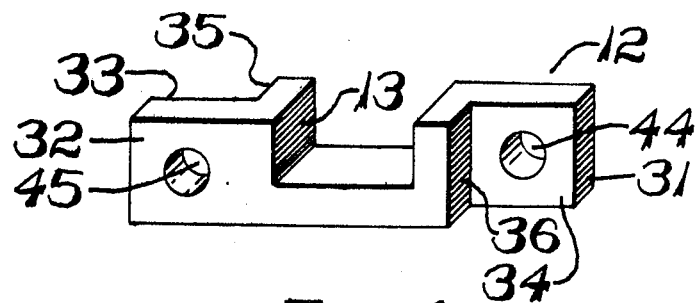
FIG. 4 is a view in perspective showing separately a particular form of torque link used in the FIG. 1 assembly.

Referring to FIG. 1, an annular segmental friction member 10 is shown having a plurality of segments 11 connected by torque links 12 which have channels 13 for embracing driving lugs or splines 14 of a rotating part such as wheel 15. It is understood that although the torque links 12 are shown connected to splines 14 of a wheel 15 at the outer periphery of the friction member 10, the torque links may be provided at the inner periphery of the friction member to engage splines of a torque tube in which case the friction member 10 would be a stator instead of a rotor as shown in FIG. 1.

As shown more clearly in FIGS. 2 and 3, each of the segments 11 is made up of a pair of plate members 16 and 17 which may of steel or other material having good wear and strength properties. Preferably, the plate members 16 and 17 are stamped in the sector-shaped configuration shown in FIG. 1 and have the same shape which makes them interchangeable and requires only one die for the stamping operation.

The plate members 16 and 17 have lug members 18 and 19 extending radially outward from the outer periphery of the members and when the plate members 16 and 17 are fastened together in back-to-back relationship, the lug members are at spaced-apart positions circumferentially of the friction member 10. In the modification shown, the plate members 16 and 17 are each approximately three-eights inch thick and when fastened together provide segments 11 which are approximately three-fourths inch thick.

The plate members 16 and 17 are fastened together by rivets 20, 21, 22 and 23 extending through aligned countersunk holes 24, 25, 26 and 27 providing connections at spaced apart positions circumferentially and radially of each of the segments 11 for maintaining circumferential and radial alignment of the plate members 16 and 17. The rivets 20, 21, 22 and 23 transfer the torque forces between the plate members which are generated by the frictional engagement of the plate members with frictional surfaces of other parts of the brake mechanism of which the friction member 10 is a part.

Referring to FIGS. 3 and 4, each of the torque links 12 has flanges 31 and 32 extending circumferentially from the channels 13 in overlapping relationship with lug members 18 and 19. The flanges 31 and 32 are offset in the axial direction of the friction member 10 so that the lug members 18 engage a face 33 on one side of the torque link 12 and the lug members 19 engage a face 34 on the other side or the torque link 12. The torque links 12 also have radially extending faces 35 and 36 for engaging the radially extending faces 37 and 38 of the lug members 18 and 19. The lug members 18 and 19 have holes 39 and 40 which are in alignment with holes 44 and 45 in flanges 31 and 32 through which rivets 46 are assembled to connect the links 12 and segments 11. The holes 39, 40, 44 and 45 as well as the holes in the plate members 16 and 17, namely holes 24, 25, 26 and 27, may be slotted in an arcuate direction or in other ways in accordance with the well known practice in the art of accommodating thermal distortion at a rivet connection. The riveted connections are made to hold the parts together for ease of assembly and also to maintain alignment; however, clearance is provided to permit contraction and expansion of the parts during operation when large thermal differentials are generated.

Figure 5:
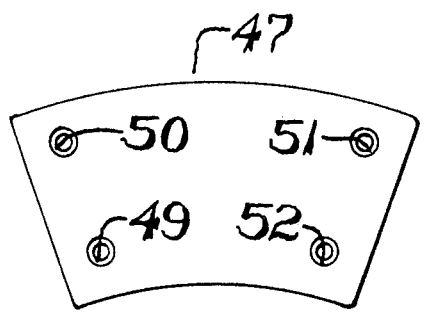
FIG. 5 is an elevational view of a segmental plate member for a modified form of the invention.
Figure 6:
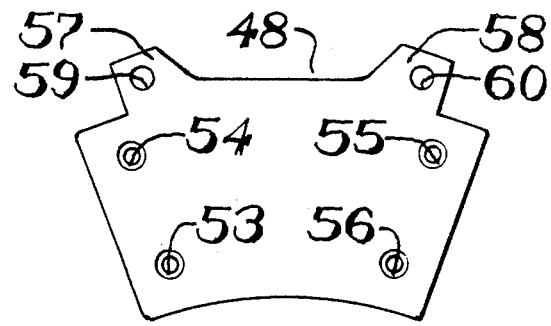
FIG. 6 is an elevational view of another segmental plate member to be used with the plate member shown in FIG. 5 for the modified form of the invention.
Figure 7:
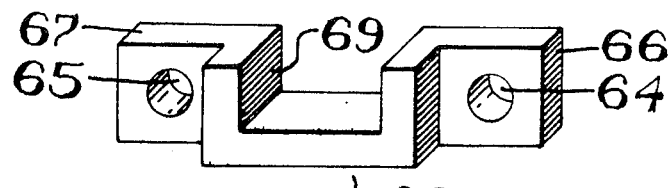
FIG. 7 is a perspective view of a torque link used with the modified forms of plate members shown in FIGS. 5 and 6.

Referring to FIGS. 5 and 6, modified forms of plate members 47 and 48 are shown which may be fastened together in the same manner as described above for plate members 16 and 17 by inserting rivets through the holes 49, 50, 51 and 52 of plate member 47 which are in alignment with holes 53, 54, 55 and 56 of plate member 48. The riveted connections are spaced circumferentially and radially of the friction members 10'. In this modification, lug members 57 and 58 extending radially outward from the outer periphery of the plate member 48 have holes 59 and 60 which are in alignment with holes 64 and 65 in flanges 66 and 67 of a torque link member 68 through which rivets may be inserted to provide segments of the friction member 10' in which the flanges 66 and 67 overlap the lug members 57 and 58 for transferring the torque forces from the plate members 47 and 48 to a channel-shaped section 69 which may be in sliding and torque transmitting engagement with a spline or lug member of a wheel. The thickness of the plate members 47 and 48 which are preferably stamped from steel are approximately three-eights inch and the thickness of the flanges 66 and 67 is approximately three-eights inch. The thickness of the segment assembled from the plate members 47 and 48 is approximately three-fourths inch and the thickness of the channel-shaped section 69 of the torque link 68 is approximately three-fourths inch.

In the operation of the brake mechanisms embodying the friction member 10 or 10' the friction engaging surfaces of the plate members 16 and 17, or 47 and 48 are engaged with friction surfaces of other rotating parts of the brake or clutch mechanism and wear will occur at these surfaces. By assembling two plates in back-to-back relationship, a segment thickness is obtained for extending the wear life of the segments 11 and 11' over that obtained with a single stamping. Also the thermal forces tending to distort the segments 11 and 11' are not as great with the overlapping plate members 16 and 17 or 47 and 48 as they would be with a single plate member having the same thickness as the pair of plate members and accordingly the distortion is reduced providing improved operation of the friction member 10 or 10' and brake mechanism. The lug members 18 and 19 or 57 and 58 have a thickness approximately one-half the thickness of the segments 11 and 11' and therefore no machining of lug members is necessary.

With the design shown in FIGS. 1, 2, 3 and 4, the lug members 18 and 19 are at opposite sides of the segments 11 and are connected to the axially offset flanges 31 and 32 of the torque links 12 providing a connection which transfers the torque forces in such a manner as to maintain the alignment of the segments and the torque links 12 for improved operation of the brake mechanism. The connections of the torque links 12 or 68 and lug members 18 and 19 or 57 and 58 are radially outward of the segments 11 and 11' and therefore outside the heat-swept area where the frictional engagement generates temperatures much higher than those in the area of the torque links. This also reduces the heat and distortion at these connecting parts.

I claim:

1. A segment for an annular segmental friction member of a brake or clutch mechanism comprising a first plate member and a second plate member fastened together in back-to-back relationship for frictional engagement with other parts of said mechanism, said first plate member having a connecting member extending radially outwardly from said second plate member at the inner or outer periphery for connecting said segment to an adjoining segment in an area spaced from the heat-swept portion of said segment.

2. A segment for an annular segmental friction member according to claim 1 wherein said connecting member of said first plate member is a lug member extending radially outwardly from the edge of said second plate member at one side of said segment and connects said segment to an adjoining segment at said one side of said segment.

3. A segment for an annular segmental friction member according to claim 2 wherein said second plate member has a lug member extending radially outwardly from the edge of said first plate member at the other side of said segment for connecting said segment to an adjoining segment at said other side of said segment.

4. A segment for an annular segmental friction member according to claim 3 wherein said first plate member and said second plate member have the same shape and are fastened together with the lug members disposed at circumferentially spaced-apart positions relative to said friction member.

5. A segment for an annular segmental friction member according to claim 2 wherein said first plate member has a second lug member extending radially outwardly from the edge of said second plate member at the other side of said segment for connecting said segment to an adjoining segment at said other side of said segment.

6. A segment for an annular segmental friction member according to claim 1 wherein said first plate member is fastened to said second plate member by rivets extending through said first plate member and said second plate member at spaced-apart positions circumferentially of said segment for transferring torque forces between the plate members and maintaining them in circumferential alignment.

7. A segment for an annular segmental friction member according to claim 6 wherein said segment further comprises rivets extending through said first plate member and said second plate member at spaced-apart positions radially of said segments for transferring torque forces between the plate members and maintaining them in radial alignment.

8. An annular segmental friction member of a brake or clutch mechanism comprising a plurality of segments connected by torque link members, each of said segments comprising a pair of plate members fastened together in back-to-back relationship for frictional engagement with other parts of said mechanism, each of said plate members having a lug member extending radially outwardly from the edge of said segments, circumferential flanges on each of said torque link members extending in overlapping relation with said lug member of each of said plate members and fastening means connecting each said lug member to one of said flanges for transferring torque forces between adjacent segments and maintaining said segments in alignment during operation.

9. An annular segmental friction member according to claim 8 wherein said plate members have the same shape and are fastened together with each said lug member at a circumferentially spaced-apart position.

10. An annular segmental friction member according to claim 9 wherein each said lug member of adjacent segments connected by one of said torque link members is on an opposite face of said segments and said flanges of said torque link members connected to the lug members are axially offset whereby torque forces are transmitted between said segments with a minimum of distortion of the friction member and of the torque link members in splined engagement with associated structures of said mechanism.

11. An annular segmental friction member according to claim 9 wherein said plate members of each of said segments are riveted at radially spaced-apart positions for transferring torque forces between the plate members and permitting expansion and contraction with a minimum of distortion of the segments.

12. An annular segmental friction member according to claim 8 wherein said flanges have a thickness substantially equal to the thickness of one of said plate members and a channel portion of said torque link member having a thickness substantially equal to the thickness of said pair of plate members providing a substantially thick segment for relatively long wear life of said segments and maximum bearing surface of said channel portion of said torque link.

* * * * *

PO-1050
(5/69)

UNITED STATES PATENT OFFICE
CERTIFICATE OF CORRECTION

Patent No. 3,670,858                    Dated  June 20, 1972

Inventor(s)  Russell F. Van Horn

It is certified that error appears in the above-identified patent and that said Letters Patent are hereby corrected as shown below:

Column 1, line 10, "invention" should be cancelled.

Column 2, line 35, after "may" insert ---be---.

Column 2, line 66, "or" should read ---of---.

In the references, "3,456,768 Le Blanc" should read ---3,456,768 Holcomb, Jr. ---.

Signed and sealed this 28th day of November 1972.

(SEAL)
Attest:

EDWARD M. FLETCHER, JR.
Attesting Officer

ROBERT GOTTSCHALK
Commissioner of Patents